March 21, 1939.     R. C. BUELL     2,151,550
MOTOR CONTROL SYSTEM
Filed Aug. 5, 1937

Inventor:
Roy C. Buell,
by Harry E. Dunham
His Attorney.

Patented Mar. 21, 1939

2,151,550

UNITED STATES PATENT OFFICE 2,151,550

MOTOR CONTROL SYSTEM

Roy C. Buell, Schenectady, N. Y., assignor to General Electric Company, a corporation of New York Application August 5, 1937, Serial No. 157,536

5 Claims. (Cl. 171—118)

My invention relates to motor control systems and particularly to systems for controlling the application of direct current excitation to a synchronous motor field winding.

One object of my invention is to provide an improved arrangement of apparatus for connecting a synchronous motor field winding to a source of excitation so that the motor will develop its maximum pull in torque when the direct current excitation is applied to the field winding.

It has been demonstrated that the amount of load which a motor can pull into step depends upon the particular point in the cycle of slip frequency current induced in the motor field circuit at which the excitation is applied and that the motor can pull into step its maximum load when the excitation is applied substantially at the instant when the half-wave of induced current flowing through the motor field winding in the negative direction reaches zero. Due to the operating time of the field switch and the time constant of the excitation circuit, it is necessary to initiate the closing operation of the field switch at a point in the cycle of induced field current prior to the point at which the excitation is applied. In United States Letters Patent No. 1,958,250, granted May 8, 1934, on an application filed by Harold T. Seeley, and assigned to the same assignee as this application, there is disclosed an arrangement whereby the excitation may be applied at a point in the slip cycle of induced field current shortly after the most favorable point. This arrangement consists of a series-connected half-wave rectifier and relay in shunt to a portion of the field discharge resistance. In order to cause the arrangement disclosed in the aforesaid patent to effect the application of excitation at the most favorable point in the cycle of induced field current, I find that I can accomplish the desired result by providing a suitable phase shifting circuit between the discharge resistance and the relay so as to shift the phase of the current in the relay a predetermined amount ahead of the current in the field winding.

Figure 1:
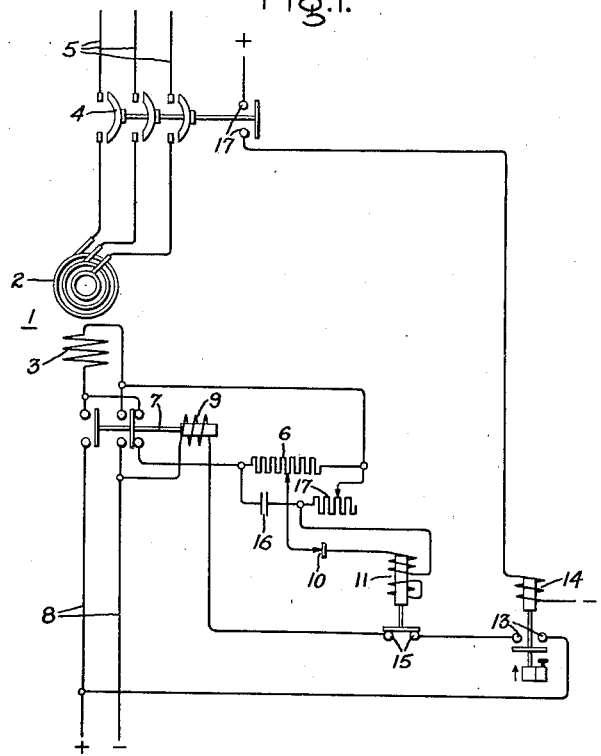
Figure 2:
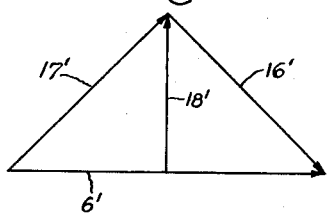

My invention will be better understood from the following description when taken in connection with the accompanying drawing, Fig. 1 of which diagrammatically shows a synchronous motor starting system embodying my invention; and Fig. 2 of which is a vector diagram relating to my invention and its scope will be pointed out in the appended claims.

Referring to Fig. 1 of the accompanying drawing, 1 represents a synchronous motor which is provided with an armature winding 2 and a field winding 3. In order to simplify the disclosure, I have shown my invention in connection with a full voltage starting arrangement for a synchronous motor so that it is started by connecting the armature winding 2 by means of a suitable manually controlled switch 4, directly across an alternating current supply circuit 5 while the field winding 3 is short-circuited through a discharge resistor 6. Therefore, normal supply circuit voltage is applied to the motor armature winding to start the motor as an induction motor. In practice, the motor also will have a squirrel cage winding, which is not shown. While I have shown a full voltage starting arrangement, it will be understood that any other well known synchronous motor starting equipment may be employed to start the motor from rest and accelerate it to approximately synchronous speed.

The connection of the field winding 3 to the discharge resistor 6 is completed by means of a two-position field switch 7 when it is in the position shown in the drawing. When the switch 7 is in its other position, the discharge resistor 6 is disconnected from the field winding 3 and the field winding 3 is connected to a suitable source of excitation 8. Switch 7 is provided with an operating winding 9 which, when energized, moves the switch 7 from the position in which it is shown to its other position, in which the source of excitation 8 is connected to the field winding 3. For controlling the energization of the operating winding 9 of the field switch 7, a half-wave rectifier 10 and the operating winding of a relay 11 are connected in series in a control circuit across which is impressed a voltage of slip frequency. Preferably, the relay 11 is of the type having a copper-jacketed winding so that it does not close its contacts until after the current in the operating winding has remained below a predetermined value for a predetermined time.

In order to prevent the field switch 7 from being closed when the switch 4 is open, the circuit of the closing coil 9 of the field switch 7 also includes the contacts 13 of a time relay 14, which is arranged to be energized to close its contacts 13 after the switch 4 has been closed a predetermined time. As shown in the drawing, this result is accomplished by providing the circuit of the winding of the relay 14 with contacts 17 which are arranged to be closed by the switch 4 when it is in its closed position.

In order to cause the relay 11 to close its contacts 15 in the circuit of the operating winding 9 of the field switch 7 at the most favorable point in the slip cycle of induced field current, I provide a phase-shifting arrangement for impressing across the control circut a voltage that is displaced in phase a predetermined amount from the induced field current. In the particular embodiment of my invention shown in the drawing, the phase-shifting arrangement includes a reactance such as a capacitor 16 and a resistor 17, preferably adjustable, serially connected in a shunt circuit around a portion of the discharge resistor 6. The control circuit, which includes the half-wave rectifier 10 and the operating winding of the relay 11, is connected between an intermediate point of the portion of the discharge resistor 6 around which the shunt circuit is completed and an intermediate point of the shunt circuit.

The operation of the arrangement shown in Fig. 1 is as follows:

When it is desired to start the motor, switch 4 is closed so that the full voltage of the supply circuit 5 is applied to the armature winding 2 to start the motor and accelerate it to approximately synchronous speed as an induction motor since the field winding 3 is closed through the discharge resistor 6. As soon as the motor armature winding 2 is energized, a voltage of slip frequency is induced in the motor field winding 3, and this induced voltage causes a current of slip frequency to flow through the field winding 3 and the discharge resistor 6. Also, a portion of the induced field current flows through the serially connected capacitor 16 and resistor 17. The slip frequency current through the portion of the discharge resistor 6, which is shunted by the serially connected capacitor 16 and resistor 17, produces a voltage drop across this portion of the resistor 6 which is out-of-phase with the voltage drop across the capacitor 16 and also across the resistor 17. This will be clearly seen by reference to Fig. 2 wherein the vector 6' represents the voltage drop across the portion of the discharge resistor 6, the vectors 16' and 17' respectively, represent the voltage drops across the capacitor 16 and the resistor 17 when the capacitor 16 and resistor 17 are of equal value, and the vector 18' represents the voltage applied to the control circuit containing the serially connected half-wave rectifier 10 and the operating winding of the relay 11. It will be seen that the voltage represented by the vector 18' leads the induced field current by a substantial amount, and it will be obvious to any one skilled in the art that by properly adjusting the adjustable resistor 17 the voltage impressed across the control circuit can be made to lead the induced field current by any desired amount.

The magnitude and frequency of the voltage impressed across the control circuit at the instant of starting are such that sufficient current flows through the half-wave rectifier 10 during alternate half cycles, to cause the relay 11 to pick up immediately and open its contacts 15. A predetermined time after the switch 4 is closed to start the motor, the relay 14 closes its contacts 13 in the circuit of the closing coil 9 of the field switch 7. The field switch, however, is not closed at this time because the contacts 15 of relay 11 are still open. The relay 14 is normally set so that it does not close its contacts 13 until sufficient time has elapsed for the relay 11 to open its contacts 15.

As the speed of the motor 1 increases, after the switch 4 is closed, the frequency of the voltage impressed across the control circuit decreases so that the intervals of zero current through the operating winding of the relay 11 increase, but due to the time delay drop-out feature of the relay 11, it does not drop out and close its contacts 15 until the motor reaches a predetermined subsynchronous speed. When the motor reaches this predetermined speed, the half cycle of induced field current which does not flow through the rectifier 10 and operating winding of relay 11 is long enough to allow the relay 11 to drop out and close its contacts 15. An energizing circuit is then completed for the closing coil 9 of the field switch 7 so that the motor field winding 3 is connected to the source of excitation 8 to pull the motor into synchronism.

By properly adjusting the adjustable resistor 17, the relay 11 can be made to drop out at the proper point so that the excitation is applied to the motor field winding at the most favorable point in the slip cycle of induced field current.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States, is:

1. In combination, a synchronous motor having a field winding, a source of excitation for said field winding, means for connecting said source to said field winding, a circuit connected to said field winding, a control circuit, means dependent upon a half cycle of current of a predetermined direction and duration in said control circuit for effecting the operation of said connecting means, and means for supplying to said control circuit a current having the same frequency as the induced field current but leading in phase a predetermined amount therefrom.

2. In combination, a synchronous motor having a field winding, a source of excitation for said field winding, means for connecting said source to said field winding, a circuit connected to said field winding, a control circuit, means controlled by the current in said control circuit for effecting the operation of said connecting means at a definite point on the cycle of current in said control circuit when the frequency thereof is a predetermined value, and means for supplying to said control circuit a current having the same frequency as the induced field current but leading in phase a predetermined amount therefrom.

3. In combination, a synchronous motor having a field winding, a source of excitation for said field winding, means for connecting said source to said field winding, a circuit connected to said field winding, a control circuit, a half wave rectifier and a time relay serially connected in said control circuit, means controlled by said relay for operating said connecting means, and means for supplying to said control circuit a current having the same frequency as but leading in phase a predetermined amount the induced field current.

4. In combination, a synchronous motor having a field winding, a source of excitation for said field winding, a discharge circuit including a discharge resistor connected in circuit with said field winding, a reactance and a resistor serially connected in a shunt circuit around a portion of said discharge resistor, a half wave rectifier and a time relay serially connected between an intermediate point of said portion of said discharge resistor and an intermediate point of said shunt circuit.

and means controlled by said relay for connecting said source of excitation to said field winding.

5. In combination, a synchronous motor having a field winding, a source of excitation for said field winding, a discharge circuit including a discharge resistor connected in circuit with said field winding, a capacitor and a resistor serially connected in a shunt circuit around a portion of said discharge resistor, a half wave rectifier and a time delay drop out relay serially connected between an intermediate point of said portion of said discharge resistor and a point intermediate said capacitor and resistor in said shunt circuit, and means controlled by said relay for connecting said source of excitation to said field winding.

ROY C. BUELL.